UNITED STATES PATENT OFFICE.

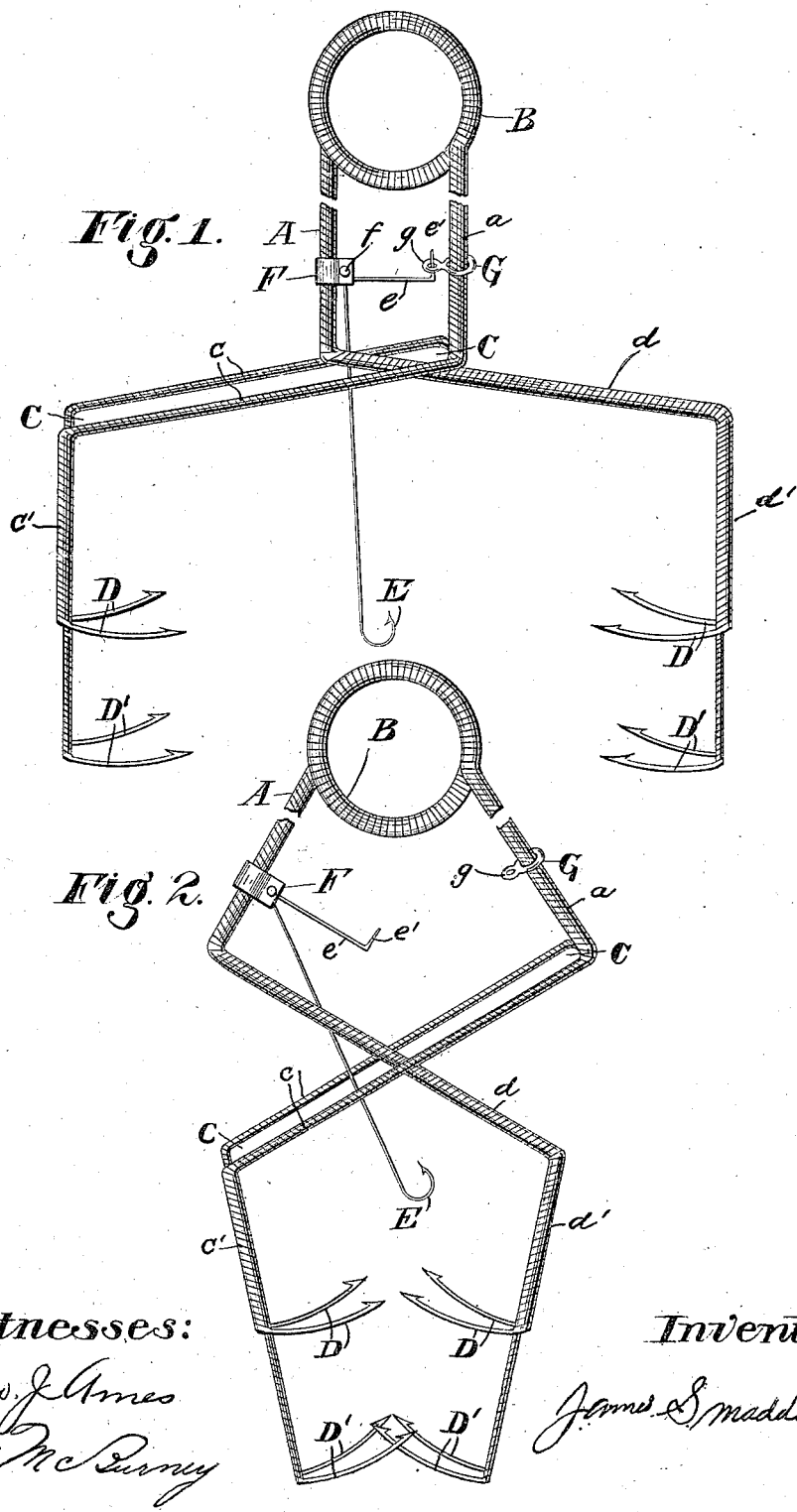

JAMES STEVEN MADDERRA, OF BUTLER, OKLAHOMA.

FISH-HOOK.

989,717.         Specification of Letters Patent.    Patented Apr. 18, 1911.

Application filed September 16, 1910. Serial No. 582,419.

*To all whom it may concern:*

Be it known that I, JAMES STEVEN MADDERRA, a citizen of the United States, residing at Butler, in the county of Custer and the State of Oklahoma, have invented a new and useful Fish-Hook, of which the following is a specification.

This invention relates to that class of fish hooks characterized by a main hook on which the bait is placed, and spring-actuated supplemental hooks between which the main hook is located, said supplemental hooks automatically seizing the fish when the bait is disturbed.

It is the object of the present invention to provide a hook of the kind stated which is simple in construction, and highly efficient in operation, together with a novel mechanism for locking and releasing the supplemental hooks; and with these objects in view, the invention consists in a combination and arrangement of parts to be hereinafter described and claimed.

In the accompanying drawing, forming a part of this specification, Figure 1 is a perspective view of the device showing the supplemental hooks in spread position, and Fig. 2 is a similar view showing the supplemental hooks released and in closed position.

In the construction of the device, I take four pieces of spring steel wire, and twist the same together so as to form a single rod. This rod is bent intermediate its ends into a loop or coil B, from which latter are extended, in spaced relation, the two ends of the rod, to form the shanks A and *a* of the supplemental hooks. The shank A has a side bend *d* at the extremity of which is a downward bend *d'* terminating in two pairs of inwardly presented hooks D and D'. The hooks D are formed by bending two of the wires inwardly, and forming the terminals of said inward bends with barbs. The hooks D' are formed by continuing the other two wires a suitable distance below the hooks D, in alinement with the portion *d'* of the shank, and then bending the terminals of the two wires inwardly, and barbing the extremities thereof. The shank *a* has a lateral bend *c* similar to the bend *d*, but in the opposite direction, so that these two bends cross. The bend *c* is in two spaced parallel parts to form a slot C through which the bend *d* loosely extends. The two parts of the bend *c* are formed by dividing the four wires of the shank *a* into two parts, each part of said bend therefore being composed of two wires which are twisted together to form a single rod. At the extremity of the bend *c* the two parts thereof are twisted together, and bent downwardly in a shank *c'*, similar to the part *d'*, and formed with hooks D and D', similar to the hooks D and D' already described. On the shank *a* is mounted a ring G having an eye *g* which is engageable by the trigger to be presently described.

To the shank A is fixed a clip F to which is pivoted, at *f*, the shank of the main hook E, said shank passing downwardly through the space between the parts *c*, so as to bring its barbed extremity between the supplemental hooks D and D'. The shank of the hook E has a lateral bend *e* at its pivoted end in the direction of the shank *a*, which bend terminates in an upstanding portion *e'* which is adapted to pass through the eye *g*.

The parts are set in operative position by drawing the shanks A and *a* together, in which position they are held by passing the part *e'* through the eye *g*. Upon drawing the two shanks together, the supplemental hooks D and D' are spread, and the main hook E is located therebetween, as shown in Fig. 1. The main hook will be suitably baited. When the fish, turtle, or the like, disturbs the bait, the main hook swings on its pivot and withdraws the part *e'* from the eye *g*, whereupon the shanks A and *a* spread, and the supplemental hooks swing toward each other, and seize the fish, this movement being effected by the spring action of the loop or coil B. The hooks are easily set, and the slightest nibble will release the same. The slot formed by the parts *c* guides the movement of the supplemental hooks, and they swing in a straight line.

I claim:

1. A fish hook comprising a pair of spaced shanks connected at one end by a spring loop, and having crossing side bends at their other ends carrying oppositely presented hooks, one of said side bends being slotted, and the other side bend passing loosely through said slot, a main hook between the aforesaid hooks, said main hook passing through the aforesaid slot, and having its shank pivoted to one of the aforesaid shanks, a trigger carried by the main hook, and means on the other shank engageable by the trigger for locking the shanks against spreading movement.

2. A fish hook comprising a plurality of wires twisted together, and bent intermediate their ends into a spring loop, spaced shanks extending from the loop, said shanks having lateral bends in opposite directions, and each of said bends having oppositely presented hooks, said hooks being formed by separating the wires constituting the bend, and one of said bends having a slot through which the other bend loosely passes, said slot being formed by separating the wires constituting the bend, a main hook connected to one of the aforesaid shanks and located between the aforesaid hooks, said main hook carrying a trigger, and means on the other shank engageable by the trigger for locking the shanks against spreading movement.

JAMES STEVEN MADDERRA.

Witnesses:
GEO. J. AMES,
F. M. McBURNEY.